UNITED STATES PATENT OFFICE 2,526,684

RUNPROOF STOCKING

Donald H. Powers, Concord, and William J. Harrison, Reading, Mass., assignors to Monsanto Chemical Company, St. Louis, Mo., a corporation of Delaware No Drawing. Application April 14, 1945,
Serial No. 588,420

4 Claims. (Cl. 117—121)

The present invention relates to the treatment of fine or shear knit fabrics, such as hosiery, to render the same resistant to runs and snags. The invention also relates to the agents or materials for accomplishing the above purposes.

In addition to providing run and snag resistance, it is also an important object of the invention to obtain fabrics of the type described which will withstand the mild washing usually given sheer fabrics and which, in the case of rayon fabrics, will have decreased luster without added opacity, and a handle and appearance resembling real silk. Still another object of the invention is to obtain sheer rayon fabrics having marked stretch recovery, which in the case of hosiery eliminates most of the bagginess commonly encountered.

The invention may be carried out by subjecting fine or sheer knit goods to treatment with certain extremely fine colloidal solutions or dispersions of polymerized silica, either in the presence or absence of a wetting agent. The colloidal solutions employed should preferably be relatively dilute, but they may be used in widely different concentrations, depending on the type of apparatus used to apply them to the yarn or fabric. The purposes of the invention are in general accomplished by applying to the fabric a sufficient amount of the colloidal solution or sol to supply from 0.1 to 5.0% silica based on the weight of the fabric being treated.

After being applied, the sol or solution on the fabric is dried, which may or may not require special drying equipment, depending on whether subsequent treatment of the yarn or fabric involves subjecting the material to drying conditions. Preferably, the fabric is passed over steam heated dry cans or infra red heated tenter frames maintained at a temperature of about 200° F. or higher, but not high enough to damage the fabric. In some cases, it is possible to dry the fabrics at lower temperatures, and even as low as room temperature. By treating the fabric in this manner, an inorganic resinous film is applied, as indicated by the fact that the resulting material is substantially dust free, withstands mild washing, and is appreciably firmer and fuller than prior to treatment.

Prior to application to the fabric, it is usually preferable to add a small amount of a suitable wetting agent to the colloidal solution or sol, as this tends to increase the penetration of the solution and enhance its run-proofing or run-resisting action and other properties. Good results, however, can frequently be obtained in the absence of such an agent. Moreover, whether or not a wetting agent is employed, it is sometimes desirable to add a softening agent to the solution.

The colloidal solutions used in accordance with the invention are preferably made by reacting an acid, such as a mineral acid or any other acid capable of forming salts by reaction with silicates, with a water-soluble silicate in the manner customarily employed to form silica gel, washing the resulting gel with water to remove the electrolytes formed during the reaction, covering the gel with a weak aqueous solution of a substance capable of forming hydroxyl ions and, after removing the gel from the solution, heating the gel, while avoiding evaporation of water, until substantially all of the gel is converted to a sol.

Solutions prepared in the above manner are preferred, since they are stable for an indefinite period of time. Moreover, the silica contained therein has a larger particle size than the silica in other types of sols, and since they are usually prepared in a neutral or slightly alkaline state, they are admirably adapted for the purposes of this invention. It is possible, however, to prepare the colloidal solutions as described above, then to acidify them and use them in a slightly acid condition, when desired. Other types of colloidal solutions or sols of silica may also be used, particularly when slip proof qualities are not required to a high degree. For example, the sols prepared by reacting water-soluble silicates with an acid and subjecting the acidified silicate to treatment with alcohol and/or to cooling to remove the electrolyte, as described in the U. S. patent to Morris D. Marshall, Number 2,285,449 and the U. S. patent to John F. White, Number 2,285,477, may be used if desired. It is also possible to use sols prepared by treatment of an alkali silicate with ion-exchange material, as described in the U. S. patent to Paul G. Bird, Number 2,244,325, as well as anhydrous organosols. However, the anhydrous sols are not as suitable as those containing a preponderant amount of water or consisting of silica and water.

The concentration of the colloidal solution or sol used is relatively unimportant, as it is possible to employ a wide variety of solution strengths depending upon the type of apparatus used or the degree of pick-up which is possible in the particular apparatus employed for applying the sol. Generally, however, it is preferable to employ solutions having an $SiO_2$ concentration between 0.1 and about 5%, although concentrations as high as 30% can be used.

A wide variety of wetting agents may be used in accordance with the invention, including such substances as the sodium salts of alkylated benzene sulfonates, such as sodium octyl benzene sulfonate and sodium decyl benzene sulfonate; sodium lauryl sulfate, the sodium salt of methyl stearamide ethionic acid, dioctyl sodium sulfosuccinate and the like. Suitable softening agents include neutral type softeners, such as aqueous emulsions of oils, fats, waxes and fatty acids, including stearic, oleic and palmitic acids or mixtures thereof; and cationic type softeners, such as cetyl dimethyl benzyl ammonium chloride and the quaternary ammonium salts of diethyl aminoethyl oleyl amide hydro-acetate. The wetting agents, if used, should be present in amounts varying from 0.1 to 5% of the colloidal solution, while the softening agent should be added in amounts varying from 0.03 to 3% of the solution.

To increase the wash fastness of the silica deposited in the fibers of the fabrics, various resins or resin formers may be added to the silica sol prior to its application to the fabric. Examples of the resins which may be used are aqueous emulsions of polyvinyl chloride, polyvinyl acetate, polymers of methyl methacrylate, polyvinyl formal, polyvinyl butyral, rubber latex, polystyrene, copolymers of these resins and the like. Various emulsifying agents such as sodium oleate, casein and the like may be used to prepare these emulsions, and in general these emulsions contain from 20 to 40% resin. Aqueous solutions of various resins may also be used, such as polyvinyl alcohol, mono or di alkylol ureas, such as methylol urea; di to hexa alkylol melamines, such as di, tri or tetra methylol melamine; alkylated alkylol ureas and akylated alkylol melamines, such as methylated, ethylated or butylated methylol urea or methylated methylol melamine. Ethylated or butylated methylol melamine may also be used, if desired, but must be in the form of an aqueous emulsion. These alkylated compounds are preferably prepared by reacting the alkylol urea or melamine with an alcohol, such as methyl, ethyl or butyl alcohol.

Varying amounts of these resins may be added to the silica sol or solution, and when the resin is used principally to increase the wash fastness of the silica deposited in or on the fibers, the amount of resin deposited in or on the fibers should be within the range of 0.1 to 5%, but in general, the weight of the resin should be substantially equal to or less than the weight of the silica deposited in or on the fiber. However, if it is desired to impart additional properties to the fabric, such as crease resistance and resistance to shrinking, the amount of resin used with the silica sol or solution may be adjusted so that as much as 10 to 20% of resin will be deposited on the fabric. When resins are used with the silica sols, it is usually desirable to dry or set the resin by heating the treated fabric at temperatures above 200° F., but not high enough to damage the fabric. However, it is sometimes possible to dry at room temperatures, as when the resin does not require curing, as in the case of polyvinyl alcohol.

Instead of resin solutions, aqueous solutions of methyl cellulose may be used for the same purpose.

A further understanding of the invention will be obtained from the following examples:

*Example I*

A colloidal solution of silica was prepared as follows: seventy-three pounds of 66° Be' $H_2SO_4$ were diluted with 358 pounds of water and charged to a mixing tank. Four hundred and seventy-two pounds of a sodium silicate solution analyzing 8.9% $Na_2O$ and 29% $SiO_2$ were diluted with three hundred and seventy-seven pounds of water and added with stirring to the acid solution. The mixture set to a gel a few minutes after the mixing was completed. After 16 hours aging the syneresis liquor was siphoned off and the gel crushed to one inch lumps. These lumps were washed with a continuous flow of water for 16 hours. The washed gel was then covered with seven hundred and fifty pounds of water containing 0.9 pound of NaOH. After standing 6 hours the excess solution was drained off and a portion of the gel was charged to an autoclave. The gel was heated for three hours, using steam at two hundred and fifteen pounds per square inch absolute pressure in the jacket of the autoclave. The contents of the autoclave were then blown out and the small amount of residual undispersed gel was removed by filtration. The solution so produced contained about 12.5% $SiO_2$ and was diluted with water until it contained only 0.6% $SiO_2$ In making sols as illustrated by the foregoing example, the aging step may be omitted entirely, but it is preferable to age for at least a few hours. The time the gel remains standing in the caustic soda solution may be as little as 30 minutes. Moreover, the time the gel remains in the autoclave may also be varied, depending upon the size and shape of the autoclave used.

Rayon hosiery, 51 gauge, was wet out in the solution prepared as described above, after which it was squeezed out to an 80% pick-up and then dried on a standard wooden form for 15 minutes at 250° F. The stockings treated in this manner did not run under conditions of normal wear, and ran only slightly under excessive strain. Moreover, the appearance and handle of the treated hosiery was more desirable than that of untreated hosiery, the treated hosiery resembling real silk hose.

The abrasion resistance of the treated hosiery was compared with the untreated hosiery by means of a Taber Abraser using CS–8 wheels and 250 grams weight. The untreated hosiery snagged at 140 cycles and wore into a hole at 521 cycles. The treated hosiery did not snag and withstood 850 cycles before wearing through, an increase of 63.2% in resistance to wear.

*Example II*

A silica sol containing about 12.5% silica was prepared as described in Example I, and then diluted with water until it contained about 0.5% silica. To this was added sufficient sodium decyl benzene sulfonate to provide about 0.2% in the solution. A sheer knitted rayon fabric was then immersed in the resulting sol or solution at 100° F., after which it was extracted to 86% pick-up and dried at 250° F. to original size. The thus treated fabric was not only run resistant and snag resistant, as shown by actual wear tests, but exhibited these characteristics after a mild laundering.

*Example III*

A colloidal solution of silica containing about 12.5% silica was prepared as described in Example I, and then diluted with water until it contained about 1.2% silica. To this was added a wetting agent consisting of a dioctyl sodium sulfosuccinate in an amount sufficient to provide about 0.25% in the solution. A fine knit Nylon fabric suitable for shirtings was immersed in the resulting solution for 10 minutes, and then removed from the bath and extracted to about 75% pick-up, after which it was boarded on standard forms and dried at 260° F. for about 10 minutes. The shirtings treated in this manner possessed exceptional resistance to runs and snags.

*Example IV*

One hundred and thirty-four and two-tenths pounds of 35.5% hydrochloric acid were diluted with 293 pounds of water and charged to a mixing tank. Four hundred and seventy-two pounds of a sodium silicate solution analyzing 8.9% $Na_2O$ and 29% $SiO_2$ were diluted with three hundred and seventy-seven pounds of water and added with stirring to the acid solution. The mixture set to a gel a few minutes after the mixing was completed, and the resulting gel was further treated as described in Example I with the formation of a colloidal solution or sol containing about 12.5% $SiO_2$. This was then diluted with water until it contained only 0.8% silica, after which sufficient sodium lauryl sulfate was added to provide about 0.3% in the solution.

Rayon hosiery, 51 gauge, was wet out in the solution prepared as described above, after which it was squeezed out to a 75% pick-up and then dried for 15 minutes at 250° F. The stockings treated in the above manner showed unusual resistance to runs and snags, and possessed a dry handle resembling that of natural silk hose.

In the examples, reference is made to the treatment of rayon and Nylon fabrics. It should be understood, however, that equally good results can be obtained with all types of textile materials, including in addition to those named above, cellulosic materials, such as cotton, cellulose nitrate, cellulose acetate, viscose, cuprammonium rayon (Bemberg) and high tensile strength rayon (Fortisan); protein materials, such as wool, natural silk and fibers made from the casein in milk (Aralac); synthetic materials such as fibers made of the copolymer of vinyl chloride and vinylidine chloride (Saran), the copolymer of adipic acid and hexamethylene diamine (Nylon), the copolymer of vinyl chloride and vinyl acetate (Vinyon), and glass fibers; and fabrics containing mixtures or blends of any two or more of the above materials.

The sols described herein may be applied either by spraying or by immersion, either with or without the assistance of padding or squeeze rolls or other types of extracting equipment. As a wide choice may be made in the strength of solution used, it is possible to use all types of apparatus in applying the sols. Thus, the desired amount of silica may be readily applied to the fabrics by adjusting the concentration of the solution in accordance with the amount of pick-up possible with the particular apparatus employed. The percent pick-up referred to herein is a measure of the amount of solution by weight picked up or retained by the fibers. For example, 100% pick-up means that the fibers have picked-up an amount by weight of the sol or solution equal to the weight of the fibers.

The preferred sols for the purposes of this invention usually have, as initially prepared, a pH ranging from about 7 to 10. It is possible, however, to employ the sols at a somewhat lower pH, if desired, as for example where an acid reacting sol is desired. Thus, the sols may be applied to the fabric within the range of 4 to 10 pH, depending on requirements and the most suitable pH for the particular fabric being treated.

By examination in the electron microscope, it has been observed that the colloidal particles in these preferred sols have a generally spherical shape. Moreover, they vary in size from about 40 to 80 millimicrons in diameter with the average particle in most instances about 60 millimicrons in diameter.

Fabrics treated with the sols of this invention possess a fullness which is retained after washing, and in the case of rayon and like fabrics have a delustered appearance without added opaqueness. The sols also impart to fabrics a greater coefficient of friction or slip resistance than similar untreated fabrics possess. This in turn results in fabrics of greater tensile strength and resistance to runs and snags. Moreover, the treated fabrics also tend to have a dry finish, which in the case of rayon gives the fabric a dry handle usually associated with natural silk. Treated rayon hose also displays unusual stretch recovery, which is highly desirable in view of the tendency of ordinary rayon hose to become baggy.

The unusual advantages obtained as a result of the application of the sols described herein are believed to be due to the sub-microscopic roughness imparted by the deposit of exceedingly small particles of silica in the form of an inorganic resinous film. The silica is in any case polymerized, or partially polymerized and produces films which have markedly different properties and effects on the fabric as compared with depositions of silica gel.

This application is a continuation-in-part of our earlier filed copending abandoned application Serial No. 546,753, filed July 26, 1944. This application is also copending with our pending application Serial No. 588,422, filed April 14, 1945, which claims methods of treating fabrics broadly.

What we claim is:

1. A substantially run-proof stocking comprising fine or sheer knit fabric which has deposited thereon from 0.1 to 5% of silica based on the weight of the fabric.

2. A substantially run-proof stocking comprising fine or sheer knit fabric which has deposited thereon from 0.1 to 5% of silica, based on the weight of the fabric, and from 0.1 to 5% of a synthetic resin.

3. A substantially run-proof stocking comprising fine or sheer knit fabric which has deposited thereon from 0.1 to 5% of silica based on the weight of the fabric, and a small amount of a wetting agent.

4. A substantially run-proof stocking comprising fine or sheer knit fabric which has deposited thereon from 0.1 to 5% of silica based on the weight of the fabric, and a small amount of a softening agent.

DONALD H. POWERS.
WILLIAM J. HARRISON.

REFERENCES CITED

The following references are of record in the file of this patent:

UNITED STATES PATENTS

| Number | Name | Date |
|---|---|---|
| 1,477,938 | Britton | Dec. 18, 1923 |
| 1,809,755 | King et al. | June 9, 1931 |

(Other references on following page)

UNITED STATES PATENTS

| Number | Name | Date |
|---|---|---|
| 1,839,168 | Stampe | Dec. 29, 1931 |
| 2,042,702 | Dreyfus | June 2, 1936 |
| 2,058,844 | Vaughn | Oct. 27, 1936 |
| 2,161,173 | Kyrides | June 6, 1939 |
| 2,285,449 | Marshall | June 9, 1942 |
| 2,285,477 | White | June 9, 1942 |
| 2,298,650 | Samaras et al. | Oct. 13, 1942 |
| 2,317,891 | Dennison | Apr. 27, 1943 |
| 2,347,733 | Christensen | May 2, 1944 |
| 2,377,841 | Marshall | June 5, 1945 |

OTHER REFERENCES

Goldsmith: "Non-ionic Surface-Active Agents," Chemical Industries, March 1943.